United States Patent [19]

Kipp

[11] Patent Number: 5,890,136
[45] Date of Patent: Mar. 30, 1999

[54] QUICK STOP MASS RETAIL SYSTEM

[76] Inventor: Ludwig Kipp, 235 Dunbar Rd., Palm Beach, Fla. 33480

[21] Appl. No.: 815,692

[22] Filed: Mar. 12, 1997

[51] Int. Cl.⁶ .................................................. G06F 17/60
[52] U.S. Cl. .............................. 705/22; 705/10; 705/28; 235/381; 186/55
[58] Field of Search .............................. 235/383, 472.01, 235/385, 375, 381; 104/88.04, 88.03; 186/55, 56; 705/1, 10, 28, 16, 17, 21, 22, 29

[56] References Cited

U.S. PATENT DOCUMENTS

| | | | |
|---|---|---|---|
| 3,746,130 | 7/1973 | Bullas | 186/56 |
| 4,554,873 | 11/1985 | Rex | 104/88.04 |
| 4,950,119 | 8/1990 | Nord et al. | 414/277 |
| 5,063,857 | 11/1991 | Kissel, Jr. | 104/88.04 |
| 5,095,195 | 3/1992 | Harman et al. | 235/381 |
| 5,186,281 | 2/1993 | Jenkins | 186/55 |
| 5,282,424 | 2/1994 | O'Neill | 104/282 |
| 5,310,997 | 5/1994 | Roach et al. | 235/375 |
| 5,434,394 | 7/1995 | Roach et al. | 235/375 |
| 5,537,313 | 7/1996 | Pirelli | 705/28 |
| 5,608,621 | 3/1997 | Caveney et al. | 705/10 |
| 5,611,051 | 3/1997 | Pirelli | 705/10 |
| 5,804,807 | 9/1998 | Murrah et al. | 235/383 |

*Primary Examiner*—Stephen R. Tkacs
*Attorney, Agent, or Firm*—Amster, Rothstein & Ebenstein

[57] ABSTRACT

A quick-stop mass retail system for ordering and purchasing articles from a remote location for pickup at an article pickup area at an automated store, comprising an interactive system for communicating a customer's purchase order for at least one article; a host computer adapted for receiving the customer's purchase order, processing the customer's purchase order, and storing the customer's purchase order in a database; a system for rapidly retrieving the article ordered by the customer from a storage location for the article at the automated store in response to customer purchase order information received from the host computer; and a system for retrieving identification information from the customer and communicating the same to the host computer; whereby the host computer enables the system for retrieving the article to provide the article to the article pickup area upon obtaining the identification information and comparing the identification information with the stored information in the customer's purchase order.

8 Claims, 5 Drawing Sheets

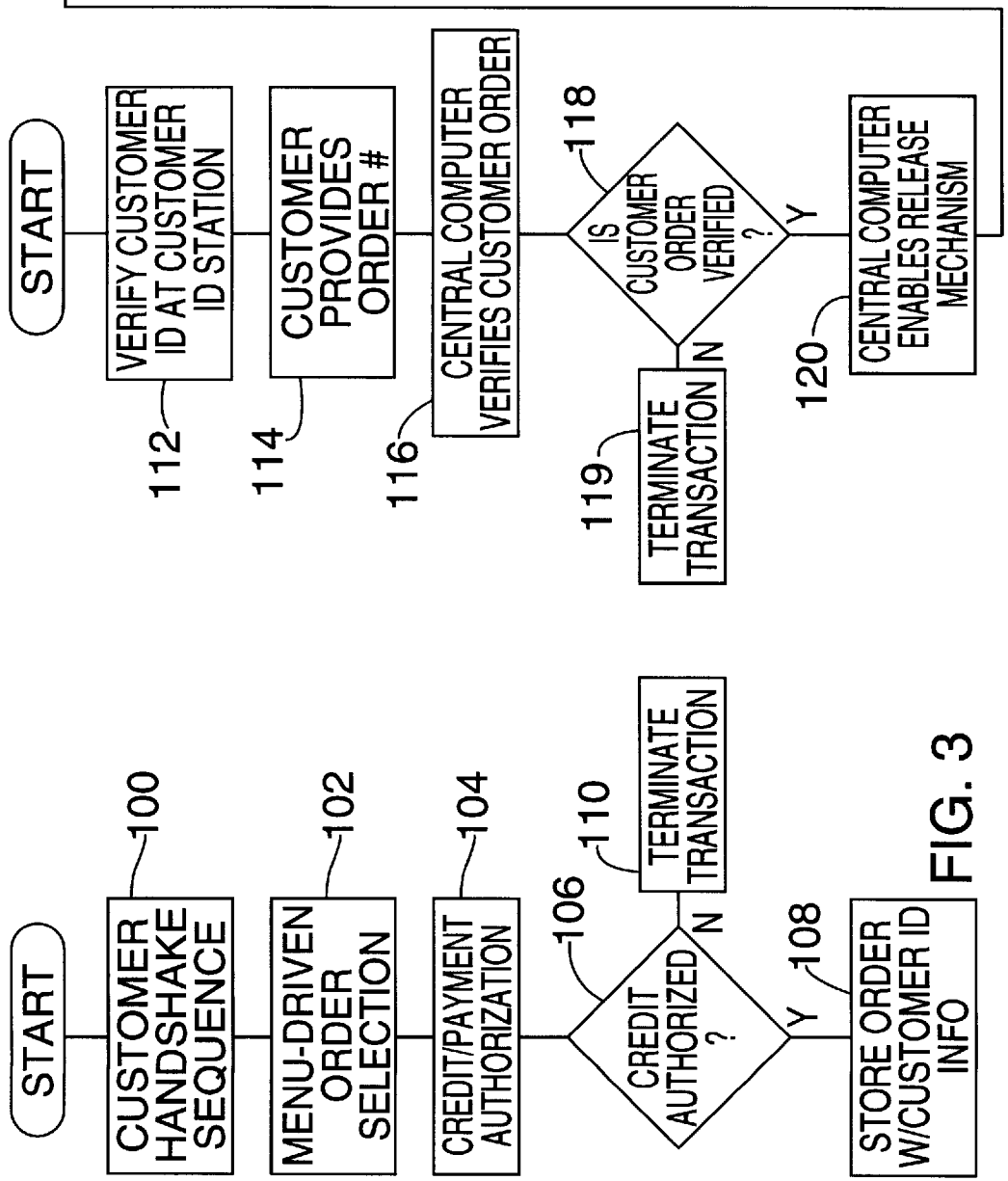
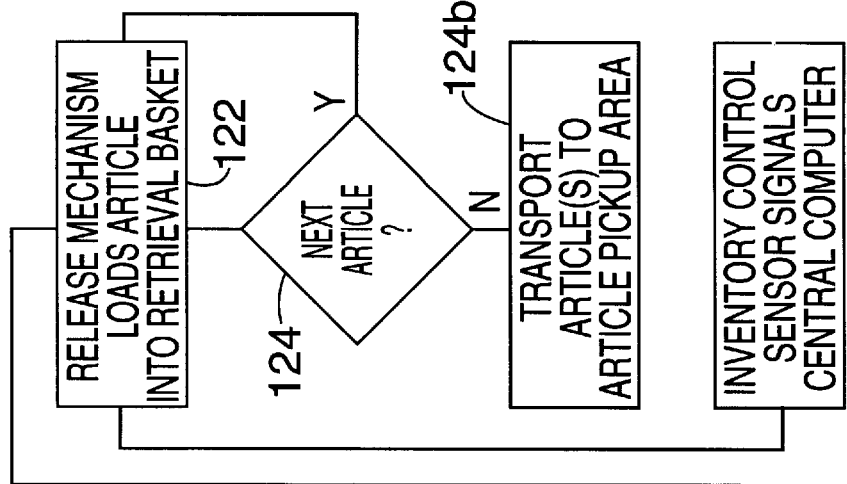
FIG. 4
FIG. 3

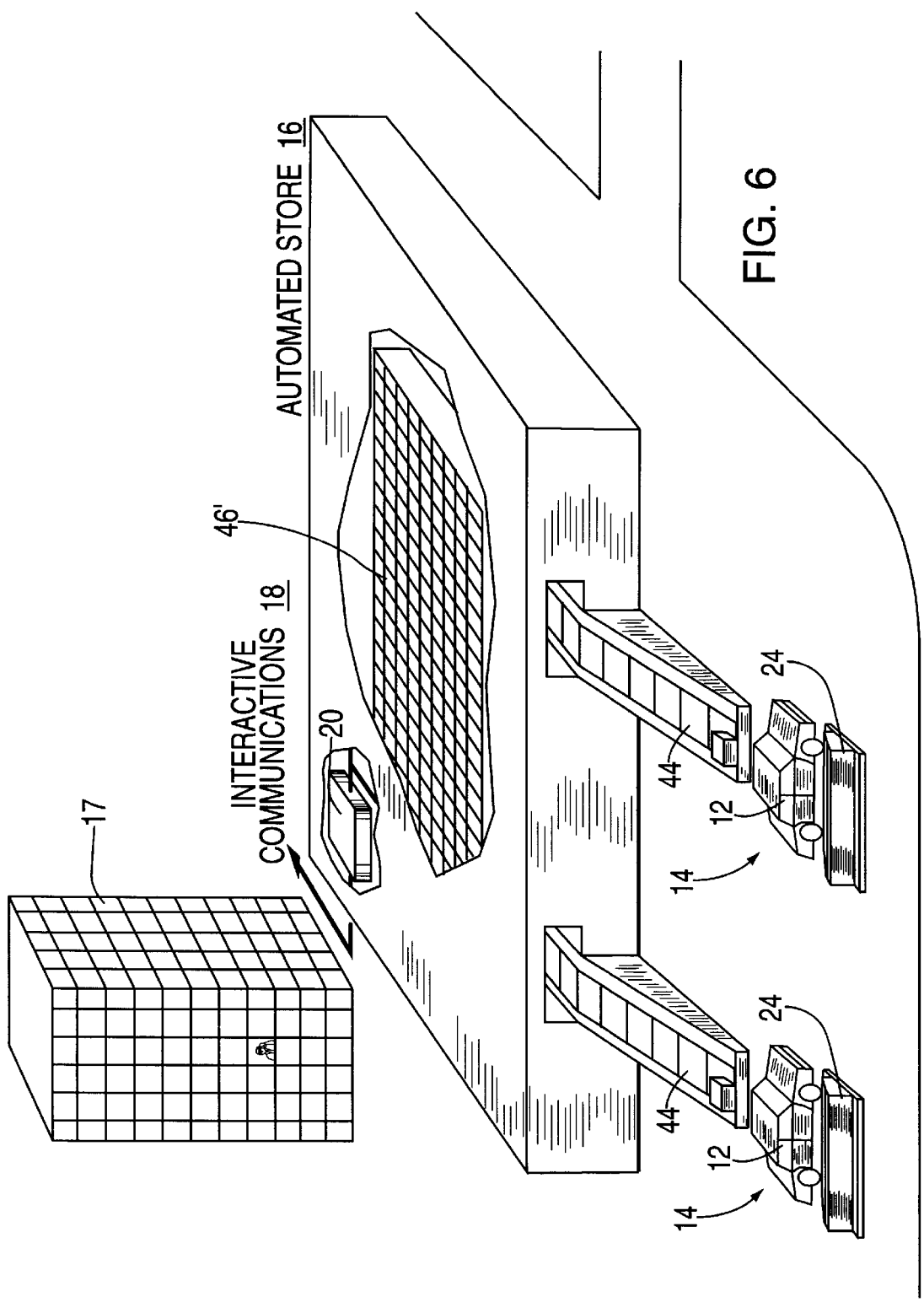

QUICK STOP MASS RETAIL SYSTEM

BACKGROUND OF THE INVENTION

The present invention relates to a computer controlled mass retail system and method for ordering and purchasing articles. In particular, the system and method enables a customer to order one or more articles via an interactive telephone or data network communicating with a central processing center, where the article(s) are automatically retrieved from inventory and rapidly delivered to an article pickup area at an automated store. The system further permits a customer to order items in stock from an access terminal for immediate delivery to the article pickup area.

With the advent of modern telecommunications and computer systems, it has been found possible to enable consumers to shop for a variety of items without ever having to leave the home. In this regard, systems have been devised which enable the purchaser to call up a processing station or store and have orders filled and ready for customer pickup at a later time. An automated store system of this type is disclosed in U.S. Pat. No. 3,746,130 ("the '130 Patent") issued to Bullas, which covers a computer controlled automated store system for dispensing stored articles from dispensers into specific containers that are identified with specific purchase orders. The containers are carried on a conveyor and identify themselves to the computer at each dispensing station and, under computer control, the ordered items are released from the dispensing stations into the containers. Attendants located at a packing station at the end of the conveyor pack the contents of each container for shipping and physically attach the invoice to the delivery cart in a bag. The packaged order is directed to an appropriate area in accordance with the shipping instructions contained on the invoice, such as a pickup station, delivery station, or "hold for future pickup" station, The customer either prepays for the order, or treats it as a charge or COD basis which will appear on the invoice and is addressed in a conventional manner at the time of pickup.

Another system for ordering articles from a remote location is disclosed in U.S. Pat. No. 5,095,195 issued to Herman, et al. ("the '195 Patent"). The '195 Patent teaches an automated video cassette dispensing system which permits the customer to automatically reserve a particular video cassette title via modem communications with a computer at a video cassette store. Alternatively, the customer can reserve a title via a telephone communication with a store attendant or by entering a coded title number on the telephone keypad. The video cassette is then held for pickup by the customer. As disclosed in the '195 Patent, the customer retrieves the reserved title by providing a membership card to an automated dispensing terminal located at the exterior of the video store.

U.S. Pat. No. 4,554,873 issued to Rex ("the '873 Patent") describes a closed transportation system for the handling and sorting of material such as mail. The system of the '873 Patent consists of self powered trolleys which run on a continuous track network. The destination and return routes of the trolleys of the '873 Patent are programmed by an operator at the point of package loading and the trolleys are guided around the network by track-side signposts.

U.S. Pat. No. 5,063,857 ("the '857 Patent") issued to Kissel also describes a transportation system consisting of specially constructed vehicles which have the ability to travel unidirectionally through a grid-patterned network of guideways. The system of the '857 Patent has the ability to transport an individual passenger or a unit of cargo.

U.S. Pat. No. 5,282,424 ("the '424 Patent") issued to O'Neill describes a method and apparatus for ground-based high speed transportation of passengers and/or freight in tunnels. In the transport system of the '424 Patent, passengers and/or freight are transported in vehicles containing a pressurizable cabin which are magnetically levitated as they move through the tunnels.

U.S. Pat. No. 4,950,119 ("the '119 Patent") issued to Nord describes a system for transporting, storing and retrieving goods within a warehouse. In the system of the '119 Patent, goods are loaded onto vehicles designed to move on a track system from a loading point to and from a multi-tier, multi-lane rack storing areas.

None of the prior art teaches a system which permits a customer located at a remote location such as his/her residence or business to automatically order articles and have them retrieved and automatically delivered to an article pickup area for customer pickup upon automated verification of the customer's identification and purchase order.

SUMMARY OF THE INVENTION

In accordance with the present invention it is an object thereof to provide a quick-stop mass retail system which enables purchasers to order and purchase articles from a remote location for pickup at an article pickup area at an automated store.

It is another object of the present invention to provide a quick-stop mass retail system that enables purchased articles to be rapidly collected and automatically delivered to the article pickup area from inventory upon receiving a customer's personal identification and comparing the same with stored data associated with the customer's purchase order.

It is yet another object of the present invention to provide a quick-stop mass retail system in which inventory of articles to be purchased is automatically tracked and maintained by a centralized purchasing system.

It is a further object of the present invention to provide an economical automatic ordering system for the distribution and pickup of articles.

It is still another object of the present invention to provide a method for ordering articles through a centralized processing center and automatically picking up articles at the article pickup area associated with the automated store.

It is yet another object of the present invention to provide a quick-stop mass retail system in which the automated store can be made substantially more compact than a conventional store. In this regard, it is possible to dramatically reduce the entire cost structure by using significantly less land and building area, on the order of 10% of that a typical store.

It is a further object of the present invention to provide a quick-stop mass retail system having an automated store in which risk of theft can be dramatically reduced by eliminating the presence of customers and employees from within the store on a day to day basis. Only 5% of the total amount of personnel in a conventional store might be present. As about 50% of the typical risk of theft is attributable to customers, and 50% to employees and others, the virtual elimination of customers from within the store can reduce the risk of theft by up to 75%.

It is still another object of the present invention to provide a quick-stop mass retail system having an automated store which, through automated operation, a reduced overall cost structure, and dramatically improved efficiency, allows merchandise to be offered to the customer at significantly lower prices as compared to typical stores.

It is yet another object of the present invention to provide a quick-stop mass retail system having an automated store which, by virtue of its reduced size, used far less energy than conventional stores.

It is a further object of the invention to provide a quick-stop mass retail system in which the automated store is a stand-alone facility, to which the customer comes and picks up his or her order.

In accordance with the above, the present invention provides a quick-stop mass retail system for ordering and purchasing articles from a remote location for pickup at an article pickup area at an automated store, comprising: an interactive system for communicating a customer's purchase order for at least one article; a host computer including provisions for receiving the customer's purchase order; processing the customer's purchase order; and storing the customer's purchase order in a database; a system for retrieving the article ordered by the customer from a storage location for the article at the automated store, the host computer communicating with the system for retrieving; a system for retrieving identification information from the customer, the system for retrieving identification information communicating with the host computer, whereby the host computer enables the system for retrieving the article to provide the article to the article pickup area upon obtaining the identification information and comparing the identification with the customer's purchase order.

The quick-stop mass retail system may further include a system to enable a plurality of articles stored in a plurality of storage locations associated with the automated store to be retrieved, including a network of dispensing stations interconnected by at least one device for transporting the articles from the storage locations to the article pickup area.

The quick-stop mass retail system may also have a system for detecting when inventory is to be restocked including, the system for detecting communicating with the host computer such that the host computer initiates a purchase of additional inventory in response to the low inventory detection, The quick-stop mass retail system may have the host computer track inventory of the articles to enable restocking of the respective storage locations when detecting inventory below a certain level.

In accordance with a specific embodiment of the invention, there is disclosed a quick-stop mass retail system for ordering and purchasing articles from a remote location for pickup at an article pickup area at an automated store, comprising:

an interactive system for communicating purchase information to the customer and communicating the customer's purchase order for at least one article; a host computer including provisions for receiving the customer's purchase order; processing the customer's purchase order; and storing the customer's purchase order in a database; a system for retrieving the article ordered by the customer from a storage location for the article at the automated store, the host computer communicating with the system for retrieving, wherein a plurality of articles are stored in a plurality of storage locations associated with the automated store and the system for retrieving the articles includes a network of dispensing stations interconnected by at least one apparatus for transporting the articles from the storage locations to the article pickup area; a system for retrieving identification information from an identification card or code associated with the customer, the system for retrieving identification information communicating with the host computer, wherein the storage locations include a system for detecting when inventory is to be restocked, the system for detecting communicating with the host computer such that the host computer initiates a purchase of additional inventory in response to the low inventory detection, whereby the host computer enables the system for retrieving the article to provide the article to the article pickup area upon obtaining the identification information and comparing the identification with the customer's purchase order.

The present invention also encompasses a method for ordering and purchasing articles from a remote location for pickup at an article pickup area at an automated store, comprising:

(a) communicating a customer's purchase order for at least one article via an interactive electronic network;

(b) receiving the customer's purchase order at a host computer in communication with the interactive electronic network;

(c) processing the customer's purchase order and storing the purchase order in a database;

(d) retrieving identification information from an identification card or code associated with the customer with a system for retrieving information communicating with the host computer; and (e) retrieving the article ordered by the customer from a storage location for the article at the automated store by a system for retrieving articles communicating with the host computer and delivering the article to the article pickup area.

The method can further comprise the step of the host computer detecting an inventory level threshold below which inventory of the article is to be restocked.

BRIEF DESCRIPTION OF THE DRAWINGS

FIG. 3 is a flow chart of an article purchase sequence;

FIG. 4 is a flow chart of an article pick-up sequence;

FIG. 6 is an isometric schematic of an automatic store in accordance with another embodiment of the present invention.

DETAILED DESCRIPTION OF THE PREFERRED EMBODIMENT

Figure 1:
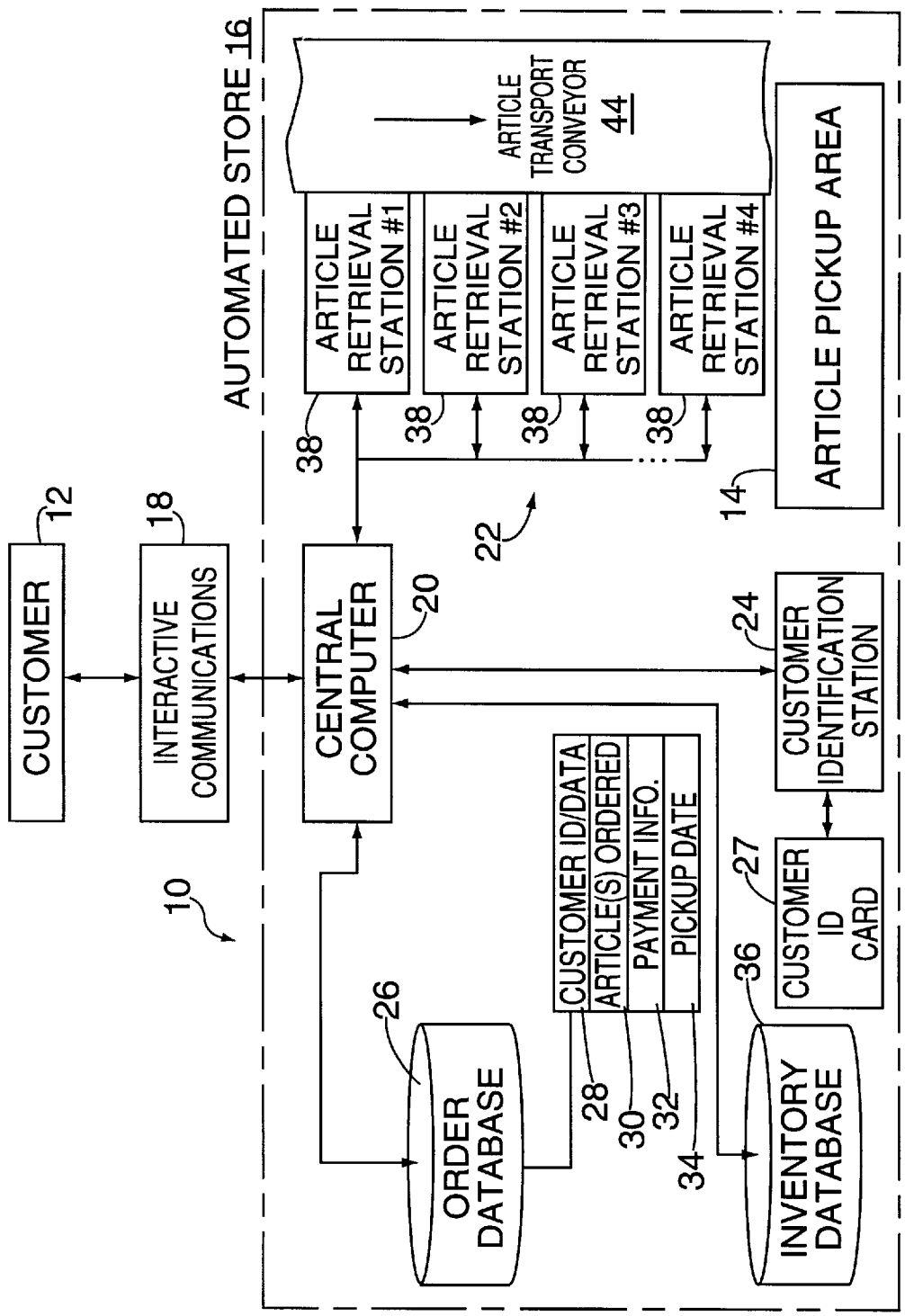
FIG. 1 is an overall schematic of the invention.

Referring to the several views of the drawings, there is depicted a quick stop mass retail system generally denoted by the reference numeral 10, for enabling a customer 12 to order and purchase articles from a remote location for subsequent pickup at an article pickup area 14 associated with an automated store 16. As shown in FIG. 1, the system generally comprises an interactive communications system 18, a central computer 20, a system 22 for retrieving articles to be purchased from a plurality of storage locations, and a customer identification station 24 for processing the customer's order to facilitate pickup of purchased articles at the article pickup area 14.

The interactive communications system 18 enables communication of customers' purchase orders and payment information for articles to be purchased to the central computer 20. The interactive communications system 18 may be of any of a variety of types, including an interactive telephone system comprised of interactive voice response units IVRUs and a central controller. Such systems enable a person to enter specific commands through a touch-tone keypad of the telephone in response to pre-programmed queries by the system. It is to be understood that such systems encompass those in which the purchaser manually keys responses into the touch-tone keypad, as well as configurations having voice activated circuitry and the like. The interactive telephone system of this type is typically associated with a standard public switched telephone network, although it is anticipated that cellular networks may be utilized as well. These arrangements are well known in the art and need not be described in detail herein.

Customer communications with the central computer 20 may also be implemented over a data network communicating with the customer's computer in accordance with conventional practice, Orders may be submitted via e-mail or over the World Wide Web by making the appropriate selections on a web page associated with the automated store 16. The customer is queried for order and payment information in the same manner as over the interactive telephone network. To ensure that payment information is not compromised over the data network, it is anticipated that various cryptographic protocols may be employed as are currently being used to ensure the integrity of credit card numbers over the Internet and World Wide Web. In either of the data or telephone network embodiments, the customer 12 establishes an account with the automated store 16 including customer specific identification information and preferred methods of payment, i.e., credit card, debit from checking account, etc. The customer 12's credit card number may be used as his or her unique identifier to be later verified at the time the purchased article or articles are picked up at the article pickup area 14. Payment for the purchase can be made either at the time of ordering or the time of pickup. The customer specific information is stored in an order data base 26 which includes a plurality of fields such as Customer ID/Data 28, Article(s) Ordered 30, Payment Info 32, and Pickup Date 34. The central computer 20 may be programmed to delete a specific order if the ordered items(s) are not picked up within a specified time period e.g., 8 hours, or a particular end-date. It is to be understood that this arrangement is merely exemplary, and that the data structure for implementing such functions can take on a variety of forms which are well known in the art of sales practices. Similarly, the central computer 20 may be constructed in a variety of configurations, and it is not necessary for the purpose of the invention to describe the same in detail. With respect to the inventive functions, computer 20 includes software which is executed to enable the central computer 20 to receive the customer's purchase orders, process the customer's purchase order, and store the same in the order database 26. Similarly, the central computer 20 maintains an inventory database 36 which tracks the articles stored in the various article storage locations to be described below. The inventory database 36 is constantly updated as articles are retrieved from the article storage locations and transported to the article pickup area 14. In this connection, the central computer 20 can be programmed such that as each customer order is filled, the inventory database 36 is updated as a result and additional articles are ordered as required. The removal of articles from their respective storage locations is tracked as described below, and a signal is sent to the central computer 20 each time an article is removed and transported to the checkout area 14.

Figure 2:
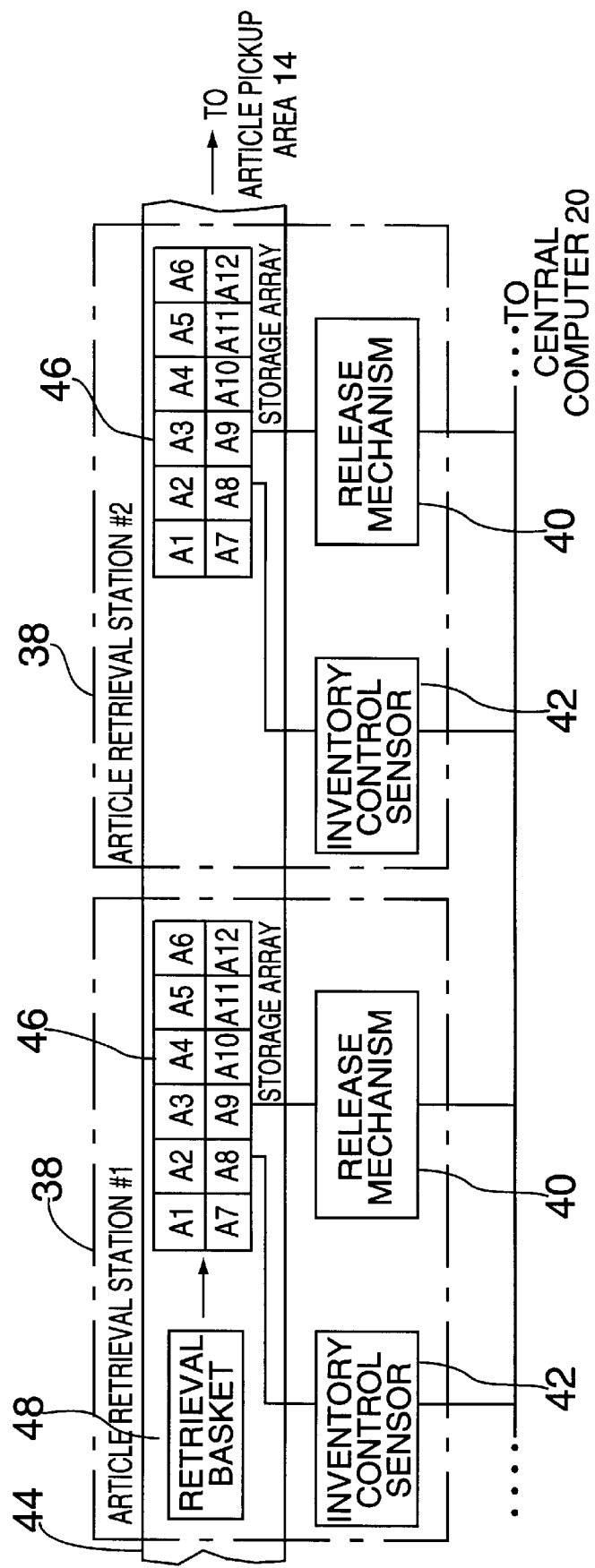
FIG. 2 is a schematic of an article retrieval station.

Referring now to FIG. 2, a plurality of article retrieval stations 38 are shown. The article retrieval station 38 is comprised of a release mechanism 40, inventory control sensor 42 and conveyor 44. Conveyor 44 may consist of an endless belt be common to a plurality of article retrieval stations 38. A plurality of articles are stored in a storage area 46, shown in the exemplary embodiment as an array containing twelve articles, A1–A12. When articles are to be dispensed from the storage area 46, the release mechanism 40 under the control of central computer 20 is enabled to cause the particular article that resides in its specific area to drop into retrieval basket 46 and eventually be transported to article pickup area 14. The central computer 20 contains in memory the specific addresses of the respective articles in each storage area 46 and thereby signals the appropriate release mechanism 40 to cause that storage area 46 to dispense the particular article into the retrieval basket 38 when the customer is verified by the system prior to pickup at the article pickup 14. The inventory control sensor 42 communicates a signal to the central computer 20 indicating that a particular article has, in fact, been dispensed from the storage area 46. If the customer orders a plurality of different articles, the central computer 20 signals the appropriate release mechanisms 40 associated with the storage areas 46 for those articles that are ordered, and the retrieval basket 48 is transported on the conveyor 44 to the different article retrieval stations until the customer's purchase order is filled. This process may take place rapidly upon verification of the customer 12's purchase order, such that ordered articles are quickly collected and delivered to the article pickup area 14. It is to be understood that this example is merely exemplary. FIG. 6 depicts an automated store 16 having a single article storage area 46' where all article retrieval stations 38 are combined. It is well known in the art to provide automatic retrieval and transportation of articles in a store to a shipping location, and a large number of permutations of this concept may be implemented in accordance with the invention. An example of a prior art automated system for providing such a function is shown in U.S. Pat. No. 3,746,130 to Bullas, the disclosure of which is incorporated herein by reference.

Figure 5:
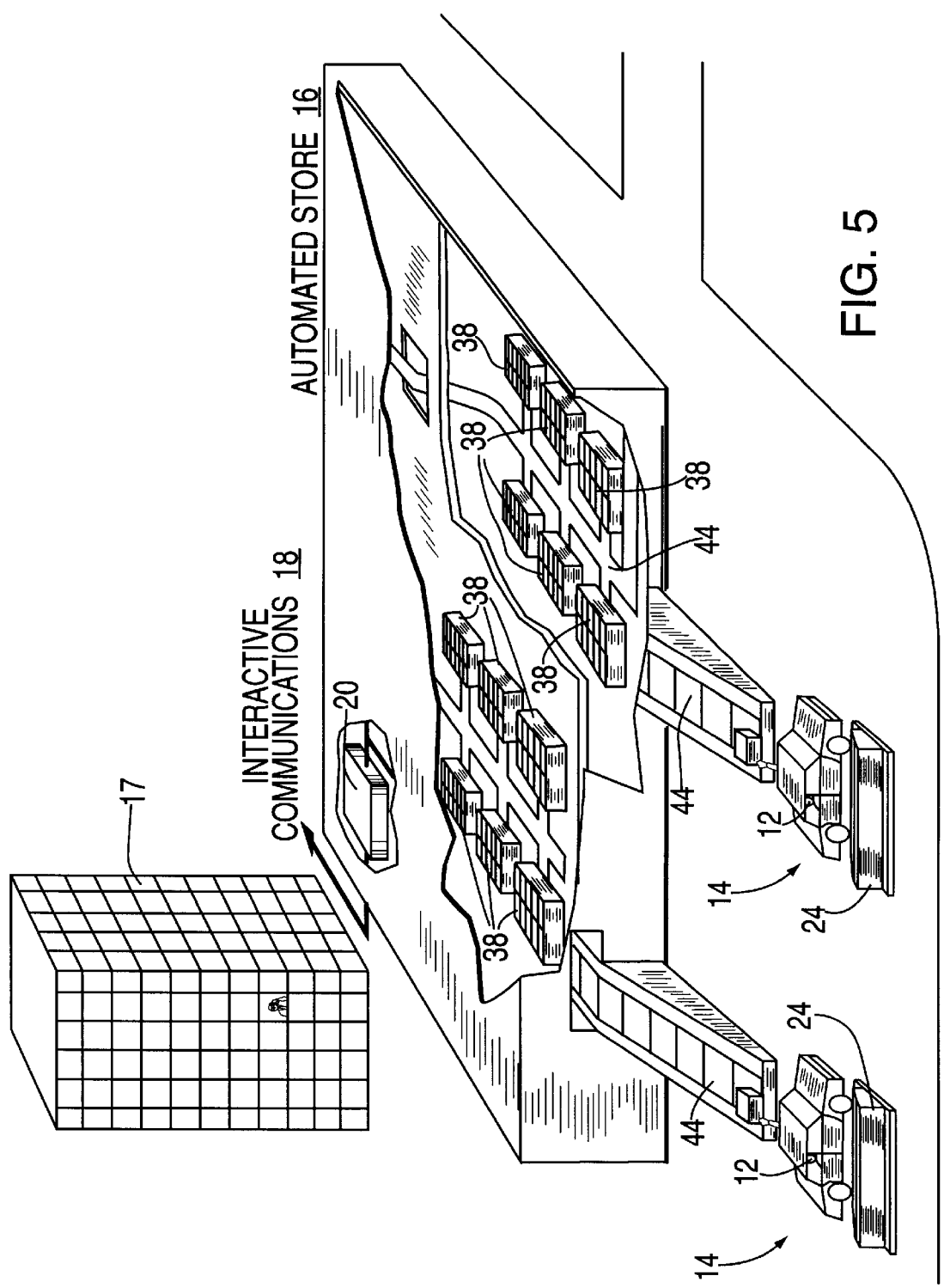
FIG. 5 is an isometric schematic of an automated store in accordance with the present invention.

The customer identification station 24 communicates with central computer 20 to enable customer identification and order checkout to be made at the time of article pickup. The customer identification station 24 may also be adapted for receiving walk-up or drive-up purchase requests, and implementing instant credit card authorization or debits from a debit card in a conventional manner. The customer identification station 24 may comprise a cardreader, fingerprint scanner, voice identification unit and the like. The customer identification station 24 in the preferred embodiment encompasses a cardreader which reads unique customer information from, for example, a credit card or special identification card 27, to enable the customer to be verified at the pickup location. This verification may comprise reading the customer 12's credit card number and some additional information unique to the customer 12 and comparing the same to information for that customer in the order database 26. Alternatively, the customer identification station 24 may include a display and keyboard to respectively enable the customer 12 to input identification information such as a unique identifier or a code associated with that customer. It can also implement a challenge/response sequence using various cryptographic protocols to authenticate a particular consumer and match that consumer to the ordered articles if security is desired. The customer identification station 24 may be disposed outside the automated store 16 in various locations, and may be adapted for drive up access as shown in FIGS. 5 and 6. In any variation, it is possible for a customer to come directly to the identification station 24, select an article to be purchased and have a credit card verification or payment made through a debit card on the spot. The order is then processed and the article is rapidly delivered to the article pickup area 14. All collateral functions associated with the operation of the automated system may be implemented in a separate office building identified generally at 17, In accordance with the present invention, there is described method for ordering and purchasing articles from a remote location for pickup at an article pickup area 14 at an automated store 16, comprising:

(a) communicating a customer 12's purchase order for at least one article via an interactive communications network;

(b) receiving a customer 12's purchase order at central computer 20 in communication with interactive communications network 18;

(c) processing the customer 12's purchase order and storing the purchase order in the order database 26;

(d) retrieving identification information from an identification card or a code at the customer identification station 24 associated with the customer 12 and communicating the identification information to the central computer 20; and (e) retrieving the article(s) ordered by the customer 12 from a storage area 46 for the article(s) at the automated store 16 via the article retrieval station device 38 and delivering the articles via a retrieval basket 48 to the article pickup area 14.

The method is schematically described in accordance with the flow chart shown in FIG. 3. Step 100 is a customer handshake sequence whereby the customer 12 establishes communications with the central computer 20 as described above. At step 102, the system provides a menu-driven order selection process for the customer 12 to select the article(s) to be purchased. Such articles are described in a separate catalog provided to the customer, or depicted on a web page being browsed on the customer 12's computer. At step 104, credit/payment authorization is made by the customer providing his or her credit card number or other authorization for payment. If credit is authorized at step 106, the customer 12's order proceeds at step 108 and if confirmed, the customer is either told that the articles are ready for pickup or that they will be available at some future date. If credit is not authorized at step 106, the transaction is terminated at step 110.

FIG. 4 shows a flow chart depicting an article pickup sequence. At step 112, the customer 12's identification is verified at the customer identification station 24. At step 114, the customer provides the order number corresponding to the transaction and enters the same into the customer identification station 24 as shown in FIGS. 5 and 6. At step 116 the central computer 20 verifies the customer 12's order by checking the order database 26 and the customer's submitted information with the information on file for that order. If the customer order is verified at step 118, then the central computer 20 enables the release mechanism 40 at step 120 associated with the article retrieval station 38 for the articles ordered to cause the articles to be rapidly dispensed into the retrieval basket 48 at step 122 and thereafter transported via the conveyor 44 to the article pickup area 14. If the customer order is not verified at step 118, the transaction is terminated at step 119. This process repeats for as many articles that were ordered by the customer until the order is filled at the step 124 and the articles are transported to the article pickup area 14 at step 126. The inventory control sensor 42 at each respective article retrieval station signals the central computer 20 that the articles dispensed have been removed from their respective storage areas 46. The central computer 20 may be programmed to automatically order additional inventory as purchased articles are withdrawn from the respective storage areas 46.

The present invention has been shown and described in what are considered to be the most preferred and practical embodiments. It is anticipated, however, that the purchase may be made therefrom and yet obvious modifications will be implemented by persons skilled in the art.

What is claimed is:

1. A quick-stop mass retail system for ordering and purchasing articles from a remote location for pickup at an article pickup area at an automated store, comprising:

interactive means for communicating a customer's purchase order for at least one article;

a host computer including means for receiving the customer's purchase order, means for processing the customer's purchase order, and means for storing the customer's purchase order in a database;

means for retrieving said article ordered by said customer from a storage location for said article at the automated store in response to customer purchase order information received from said host computer; and means for retrieving identification information from said customer and communicating the same to said host computer;

whereby said host computer enables said means for retrieving said article to provide said article to the article pickup area upon obtaining said identification information and comparing said identification with the customer's purchase order.

2. The quick-stop mass retail system recited in claim 1, wherein a plurality of articles are stored in a plurality of storage locations associated with the automated store and said means for retrieving said articles includes a network of dispensing stations interconnected by at least one means for transporting said articles from said storage locations to the article pickup area.

3. The quick-stop mass retail system recited in claim 2, wherein said storage locations include means for detecting when inventory is to be restocked, said means for detecting communicating with said host computer such that said host computer initiates a purchase of additional inventory in response to the low inventory detection.

4. The quick-stop mass retail system recited in claim 1, wherein said host computer tracks inventory of said articles and enables restocking of said respective storage locations when detecting inventory below a certain level.

5. The quick-stop mass retail system recited in claim 1, wherein said means for retrieving identification information reads said identification information from an identification card or a code associated with the customer.

6. A quick-stop mass retail system for ordering and purchasing articles from a remote location for pickup at an article pickup area at an automated store, comprising:

interactive means for communicating a customer's purchase order for at least one article, said interactive means including at least one of an interactive telephone network for receiving touch-tone input signals from a telephone keypad in response to requests for purchase information communicated to the customer, and a modem connection over a data network in response to requests for purchase information communicated to the customer;

a host computer including means for receiving the customer's purchase order; means for processing the customer's purchase order; and means for storing the customer's purchase order in a database;

means in communication with said host computer for retrieving said article ordered by said customer from a storage location for said article at the automated store, wherein a plurality of articles are stored in a plurality of storage locations associated with the automated store and said means for retrieving said articles includes a network of dispensing stations interconnected by at least one means for transporting said articles from said storage locations to the article pickup area;

means in communication with said host computer for retrieving identification information from an identification card associated with said customer;

means associated with said storage locations for detecting inventory of articles stored therein and communicating with said host computer such that said host computer initiates a purchase of additional inventory in response to the low inventory detection;

whereby said host computer enables said means for retrieving said article to provide said article to the article pickup area upon obtaining said identification information and comparing said identification with the customer's purchase order.

7. A method for ordering and purchasing articles from a remote location for pickup at an article pickup area at an automated store, comprising:

(a) communicating a customer's purchase order for at least one article via an interactive electronic network;

(b) receiving the customer's purchase order at a host computer in communication with said interactive electronic network;

(c) processing the customer's purchase order and storing the purchase order in a database;

(d) retrieving identification information from the customer with a means for retrieving information communicating with said host computer; and (e) retrieving said article ordered by the customer from a storage location for said article at the automated store by a means for retrieving articles communicating with said host computer and delivering said article to said article pickup area.

8. The method recited in claim 7, further comprising the step of said host computer detecting an inventory level threshold below which inventory of said article is to be restocked.

* * * * *